(12) United States Patent
Kato (10) Patent No.: US 9,706,075 B2
(45) Date of Patent: Jul. 11, 2017

(54) IMAGE PROCESSING SYSTEM, INFORMATION PROCESSING APPARATUS, IMAGE PROCESSING METHOD, INFORMATION PROCESSING METHOD, AND STORAGE MEDIUM

(71) Applicant: CANON KABUSHIKI KAISHA, Tokyo (JP)

(72) Inventor: Natsuki Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/485,498

(22) Filed: Sep. 12, 2014

(65) Prior Publication Data

US 2015/0077812 A1 Mar. 19, 2015

(30) Foreign Application Priority Data

Sep. 18, 2013 (JP) .................. 2013-193038

(51) Int. Cl.
| | |
|---|---|
| G06K 15/00 | (2006.01) |
| H04N 1/46 | (2006.01) |
| H04N 1/00 | (2006.01) |
| G06F 3/048 | (2013.01) |
| H04N 1/21 | (2006.01) |

(52) U.S. Cl.
CPC ......... *H04N 1/2179* (2013.01); *H04N 1/0035* (2013.01); *H04N 1/00127* (2013.01); *H04N 1/00135* (2013.01); *H04N 1/00225* (2013.01); *H04N 1/00244* (2013.01); *H04N 1/00347* (2013.01); *H04N 1/00408* (2013.01); *H04N 1/00413* (2013.01); *H04N 1/00416* (2013.01); *H04N 1/00421* (2013.01); *H04N 1/00482* (2013.01); *H04N 1/00509* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,741,996 B1 * | 5/2004 | Brechner .......... | G06F 17/30017 |
| 6,915,299 B1 * | 7/2005 | Arcuri .............. | G06F 17/30011 |
| 7,603,376 B1 * | 10/2009 | Narayanaswamy | |
| | | .......................... | G06F 17/30082 |
| 9,282,169 B1 * | 3/2016 | Chang ................ | H04L 67/42 |
| 9,336,221 B2 * | 5/2016 | Miyamoto ........ | G06F 17/30126 |
| 2003/0064355 A1 * | 4/2003 | Florance ............ | G06Q 10/10 |
| | | | 434/362 |
| 2004/0030719 A1 * | 2/2004 | Wei ................... | G06F 17/30905 |
| 2004/0083273 A1 * | 4/2004 | Madison ............ | H04L 29/06 |
| | | | 709/217 |
| 2005/0050043 A1 * | 3/2005 | Pyhalammi ....... | G06F 17/30265 |

(Continued)

FOREIGN PATENT DOCUMENTS

| | | |
|---|---|---|
| CN | 103108097 A | 5/2013 |
| JP | 2003-316628 A | 11/2003 |
| JP | 2008-072256 A | 3/2008 |

*Primary Examiner* — Madelein Nguyen
(74) *Attorney, Agent, or Firm* — Canon U.S.A., Inc. IP Division (57) ABSTRACT

When an MFP receives selection of any one of a plurality of folders managed in a hierarchy, the MFP displays, if the selected folder has subfolders, a list of the subfolders on a display unit, and displays, if the selected folder has no subfolders, a setting screen for setting a reading parameter for a document on the display unit.

15 Claims, 9 Drawing Sheets

(56) References Cited

U.S. PATENT DOCUMENTS

| | | | |
|---|---|---|---|
| 2005/0160079 A1* | 7/2005 | Turski | G06F 9/4443 |
| 2006/0033954 A1* | 2/2006 | Kamijima | H04N 1/32128 358/1.15 |
| 2006/0085474 A1 | 4/2006 | Tsubono | |
| 2006/0265242 A1* | 11/2006 | Kashioka | 705/1 |
| 2006/0279780 A1* | 12/2006 | Anno | G06F 3/1204 358/1.15 |
| 2007/0061745 A1* | 3/2007 | Anthony | G06F 3/0481 715/764 |
| 2007/0081197 A1* | 4/2007 | Omoigui | G06F 17/30528 358/403 |
| 2007/0101294 A1* | 5/2007 | Fong | G06F 17/30274 715/838 |
| 2007/0247646 A1* | 10/2007 | Igari | H04N 1/00204 358/1.6 |
| 2007/0276962 A1* | 11/2007 | La Pensee | G06F 17/30174 709/248 |
| 2008/0055661 A1* | 3/2008 | Yoshida | H04N 1/00912 358/403 |
| 2008/0062471 A1 | 3/2008 | Matsuda | |
| 2008/0098309 A1* | 4/2008 | Fries | G06F 9/4443 715/734 |
| 2008/0104145 A1* | 5/2008 | Lipman | G06F 11/1456 |
| 2008/0150892 A1* | 6/2008 | Duhig | G06F 17/30274 345/156 |
| 2008/0209363 A1* | 8/2008 | Kuroda | G06Q 10/10 715/838 |
| 2008/0239387 A1* | 10/2008 | Otsuka | G06F 3/1204 358/1.15 |
| 2008/0252944 A1* | 10/2008 | Otsuka | H04N 1/00413 358/474 |
| 2009/0113075 A1* | 4/2009 | Migault | H04L 29/12066 709/245 |
| 2009/0187945 A1* | 7/2009 | Beck | H04N 5/44543 725/46 |
| 2009/0225365 A1* | 9/2009 | Hayakawa | G06K 15/02 358/1.15 |
| 2010/0007928 A1* | 1/2010 | Kashioka | H04N 1/00225 358/474 |
| 2010/0017803 A1* | 1/2010 | Shibuya | H04N 1/00347 718/100 |
| 2010/0027057 A1* | 2/2010 | Fujisawa | H04N 1/00217 358/1.15 |
| 2010/0131573 A1* | 5/2010 | Reese et al. | 707/812 |
| 2010/0134817 A1* | 6/2010 | Torii | H04N 1/00413 358/1.13 |
| 2010/0205566 A1* | 8/2010 | Matoba | G06F 3/0488 715/838 |
| 2010/0281428 A1* | 11/2010 | Kuroda | G06F 3/0481 715/811 |
| 2011/0066471 A1* | 3/2011 | Kitada | G06Q 10/10 707/608 |
| 2011/0242568 A1* | 10/2011 | Soga | G06F 3/1204 358/1.13 |
| 2012/0096389 A1* | 4/2012 | Flam | G06F 17/3089 715/777 |
| 2012/0110515 A1* | 5/2012 | Abramoff et al. | G06F 17/30994 715/854 |
| 2012/0183118 A1* | 7/2012 | Halliburton | A61B 6/032 378/16 |
| 2012/0246115 A1* | 9/2012 | King | G06F 21/6227 707/626 |
| 2013/0033721 A1* | 2/2013 | Miyamoto | G06F 3/1285 358/1.14 |
| 2013/0055364 A1 | 2/2013 | Tanji | |
| 2013/0135640 A1* | 5/2013 | Nagasaki | G06F 3/122 358/1.11 |
| 2013/0138608 A1* | 5/2013 | Smith | G06F 17/30575 707/610 |
| 2013/0141743 A1* | 6/2013 | Miyazawa | H04N 1/4426 358/1.13 |
| 2013/0179808 A1* | 7/2013 | Kano | G06F 3/01 715/760 |
| 2013/0235413 A1* | 9/2013 | Terao | G06F 21/608 358/1.14 |
| 2013/0250326 A1* | 9/2013 | Kono | G06F 3/1204 358/1.13 |
| 2013/0268480 A1* | 10/2013 | Dorman | G06F 17/30176 707/608 |
| 2014/0016153 A1* | 1/2014 | Miyata | H04N 1/00408 358/1.13 |
| 2014/0032518 A1* | 1/2014 | Cohen et al. | 707/706 |
| 2014/0059002 A1* | 2/2014 | Lockhart | G06F 17/30174 707/622 |
| 2014/0092413 A1* | 4/2014 | Shibata | H04N 1/00204 358/1.13 |
| 2014/0101212 A1* | 4/2014 | Maze | G06F 17/30203 707/827 |
| 2014/0185082 A1* | 7/2014 | Yamada | G06F 3/1206 358/1.14 |
| 2014/0293361 A1* | 10/2014 | Mori | H04N 1/32379 358/403 |
| 2015/0081702 A1* | 3/2015 | Kato | H04L 67/1097 707/736 |

* cited by examiner

900 SCAN SETTING SCREEN

| SCAN SETTING |
| /STUDENT/Aaron Smith/TEACHER REPORT — 911    902 |
| 901 — FILE NAME   STUDENT_Aaron Smith_TEACHER REPORT |
| 903 — COLOR ▼          PDF + HIGH-COMPRESSION ▼ — 907 |
| 904 — 300*300 dpi ▼    PREVIEW DISPLAY ▼ — 908 |
| 905 — TWO-SIDED ▼ |
| 906 — MIXED DOCUMENT ▼          910 |
| 909 — CANCEL          UPLOAD START |

IMAGE PROCESSING SYSTEM, INFORMATION PROCESSING APPARATUS, IMAGE PROCESSING METHOD, INFORMATION PROCESSING METHOD, AND STORAGE MEDIUM

BACKGROUND OF THE INVENTION

Field of the Invention

The present invention relates to an image processing system, an information processing apparatus, an image processing method, an information processing method, and a storage medium capable of selecting any one of a plurality of folders managed in a hierarchy.

Description of the Related Art

Conventionally, a scanner apparatus, which reads an image on a document to generate image data, has been known. The image data generated by the scanner apparatus can be transmitted to an external apparatus (e.g., a personal computer (PC) or a file server) on a network and stored in a folder created in the external apparatus. If a folder is created in the scanner apparatus, the image data can also be stored in the folder.

It has been known that when the folder serving as a storage destination of the image data is designated, information about folders managed in a hierarchy is acquired within the external apparatus or the scanner apparatus, and a list of the folders is displayed on a display unit (see Japanese Patent Application Laid-Open No. 2008-072256). A user of the scanner apparatus can designate any folder as the storage destination of the image data based on the list of the folders displayed on the display unit.

When any folder A is selected from a folder group in a hierarchy A, a group of subfolders just below the folder A among subfolders of the folder A (a folder group in a hierarchy B that is one level lower than the hierarchy A) is list-displayed. When a user issues an instruction to read a document in this state, a setting screen for setting a reading parameter is displayed, and image data generated based on the set reading parameter is stored in the folder A. On the other hand, when an arbitrary folder B is selected from the folder group in the hierarchy B list-displayed, a group of subfolders just below the folder B among subfolders of the folder B (i.e., a folder group in a hierarchy C that is one level lower than the hierarchy B) is list-displayed.

If the folder A has thus been designated as a storage destination of image data, two operations, i.e., an operation for selecting the folder A from the folder group in the hierarchy A and an operation for issuing an instruction to read the document with the folder group in the hierarchy B displayed have been required.

Even if the folder A has no subfolders (if there is no folder existing in the hierarchy B), the above-mentioned two operations have been required to designate the folder A as a storage destination of the image data. If the folder A has no subfolders, an empty list is displayed according to the selection of the folder A, and an operation for issuing an instruction to read the document is performed in this state.

More specifically, if the folder having no subfolders has been selected, it has taken time and labor to separately perform the operation for issuing the instruction to read the document regardless of a high possibility that the folder is used as a storage destination of the image data at the time point where the folder has been selected.

SUMMARY OF THE INVENTION

The present invention is directed to providing a mechanism for reducing time and labor to designate a storage destination of image data generated by reading a document.

According to an aspect of the present invention, an image processing system includes a management unit configured to manage a plurality of folders in a hierarchy, a reading unit configured to read an image on a document to generate image data, a receiving unit configured to receive selection of any one of the plurality of folders, and a display control unit configured to display, when the selected folder has subfolders, a list of the subfolders on a display unit, and to display, when the selected folder has no subfolders, a setting screen for setting a reading parameter for the document on the display unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. It should be noted that the exemplary embodiment, described below, is not intended to limit the invention according to the scope of claims, and all combinations of features described in the exemplary embodiment are not necessarily essential for means for solving the invention.

Figure 1:
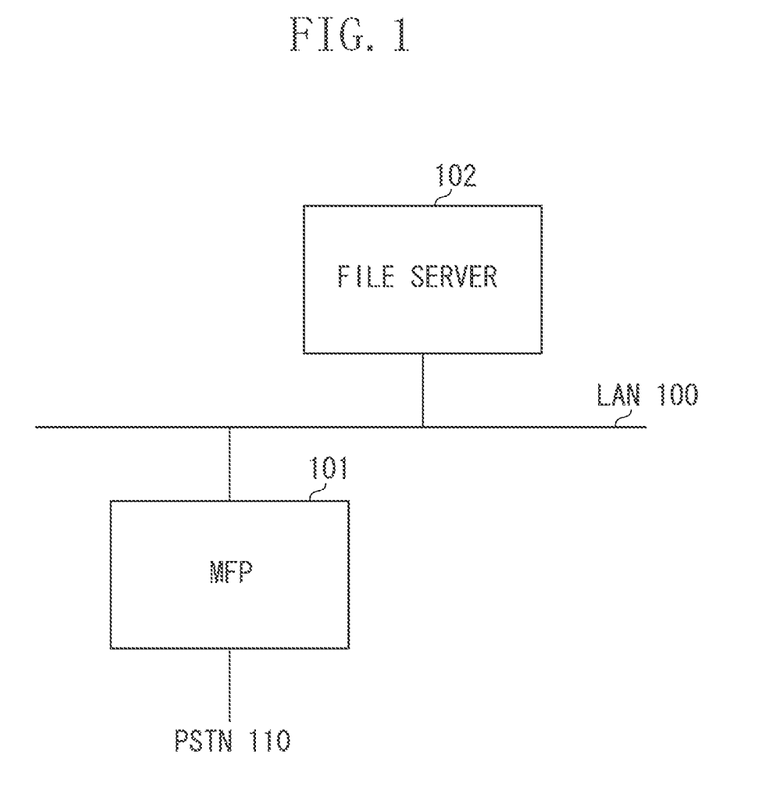
FIG. 1 is an overall view of an image processing system according to an exemplary embodiment of the present invention.

FIG. 1 is an overall view of an image processing system. An MFP 101 and a file server 102 are connected to be communicable with each other onto a network (a local area network (LAN)) 100. The MFP 101 is an example of an information processing apparatus. While the MFP is used as an example of the information processing apparatus, the information processing apparatus does not need to be the MFP as far as it has a scanner function. The information processing apparatus may be a PC or a mobile terminal capable of communicating with a scanner apparatus.

The file server 102 is an example of an external apparatus. While a whole including the MFP 101 and the file server 102 is the image processing system, only the MFP 101 can also be referred to as the image processing system. The MFP 101 is also connected to a public switched telephone network (PSTN) 110, and can perform facsimile communication of image data with a facsimile apparatus (not illustrated).

Figure 2:
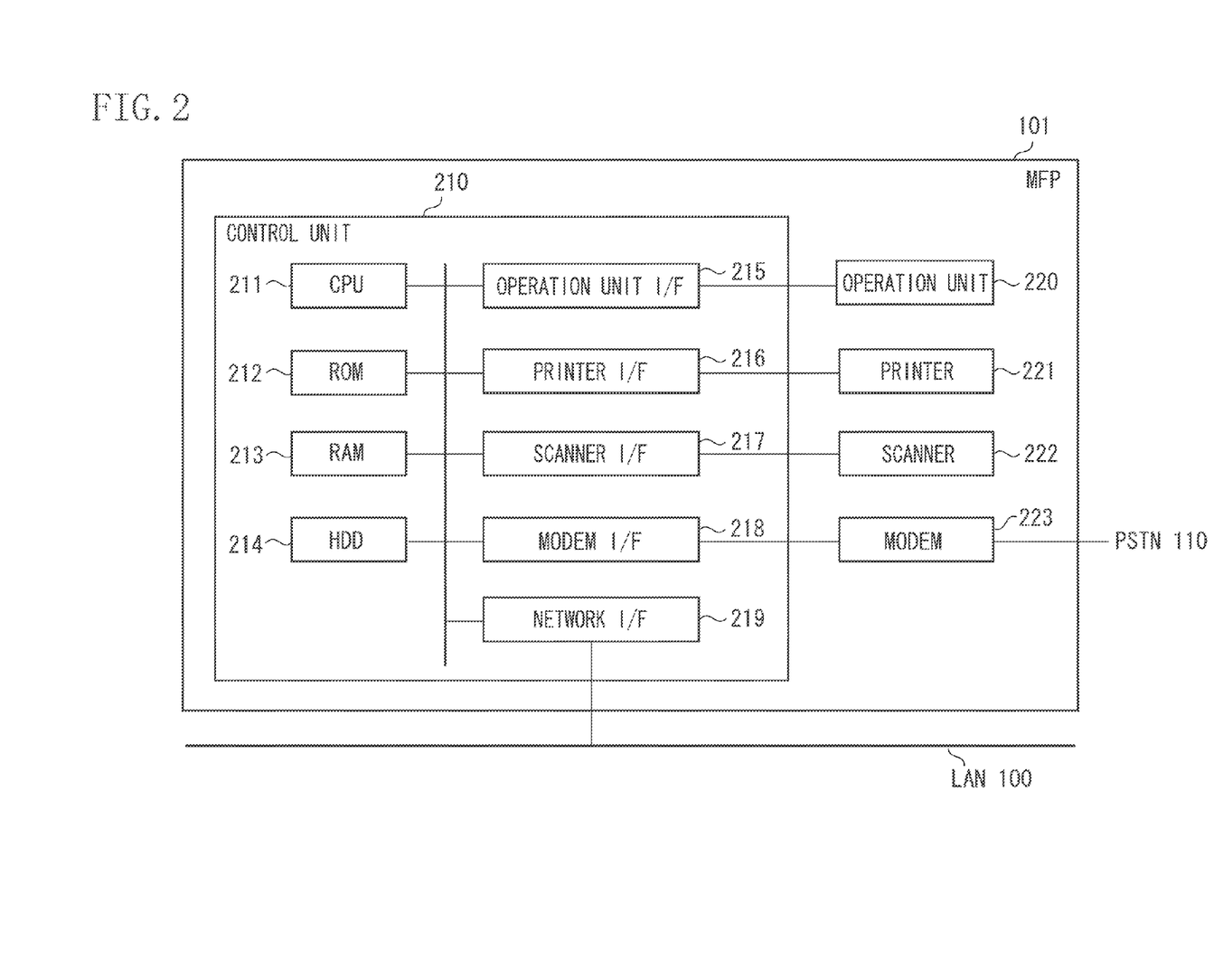
FIG. 2 illustrates a hardware configuration of a multi-function peripheral (MFP) in the exemplary embodiment of the present invention.

FIG. 2 illustrates a hardware configuration of the MFP 101. A control unit 210 including a central processing unit (CPU) 211 controls an entire operation of the MFP 101. The CPU 211 reads out a control program stored in a read-only memory (ROM) 212, and performs various types of control such as reading, printing, and communication. A random access memory (RAM) 213 is used as a temporary storage area such as a main memory or a work area of the CPU 211. While one CPU 211 performs each of processes illustrated in flowcharts, described below, using one memory (the RAM 213 or a hard disk drive (HDD) 214) in the MFP 101, the MFP 101 may have another configuration. For example, a plurality of CPUs can also perform each of the processes illustrated in the flowcharts in cooperation with a plurality of RAMs or HDDs.

The HDD 214 stores image data and various types of programs. An operation unit interface (I/F) 215 connects an operation unit 220 and the control unit 210. The operation unit 220 includes a liquid crystal display unit having a touch panel function or a keyboard, and functions as a receiving unit for receiving an operation, an input, or an instruction by a user.

A printer I/F 216 connects a printer 221 and the control unit 210. Image data to be printed by the printer 221 is transferred from the control unit 210 via the printer I/F 216, and is printed on a recording medium by the printer 221.

A scanner I/F 217 connects a scanner 222 and the control unit 210. The scanner 222 reads an image on a document to generate image data, and inputs the generated image data to the control unit 210 via the scanner I/F 217. The MFP 101 can transmit the image data generated by the scanner 222 to the file server 102 using a Web-based Distributed Authoring and Versioning (WebDAV) protocol. The WebDAV may be replaced with a File Transfer Protocol (FTP) or a Server Message Block (SMB).

A modem I/F 218 connects a modem 223 and the control unit 210. The modem 223 performs facsimile communication of image data with a facsimile apparatus (not illustrated). A network I/F 219 connects the control unit 210 (the MFP 101) to the LAN 100. The MFP 101 transmits image data and information to the external apparatus (e.g., the file server 102) on the LAN 100 using the network I/F 219, and receives various types of information.

Figure 3:
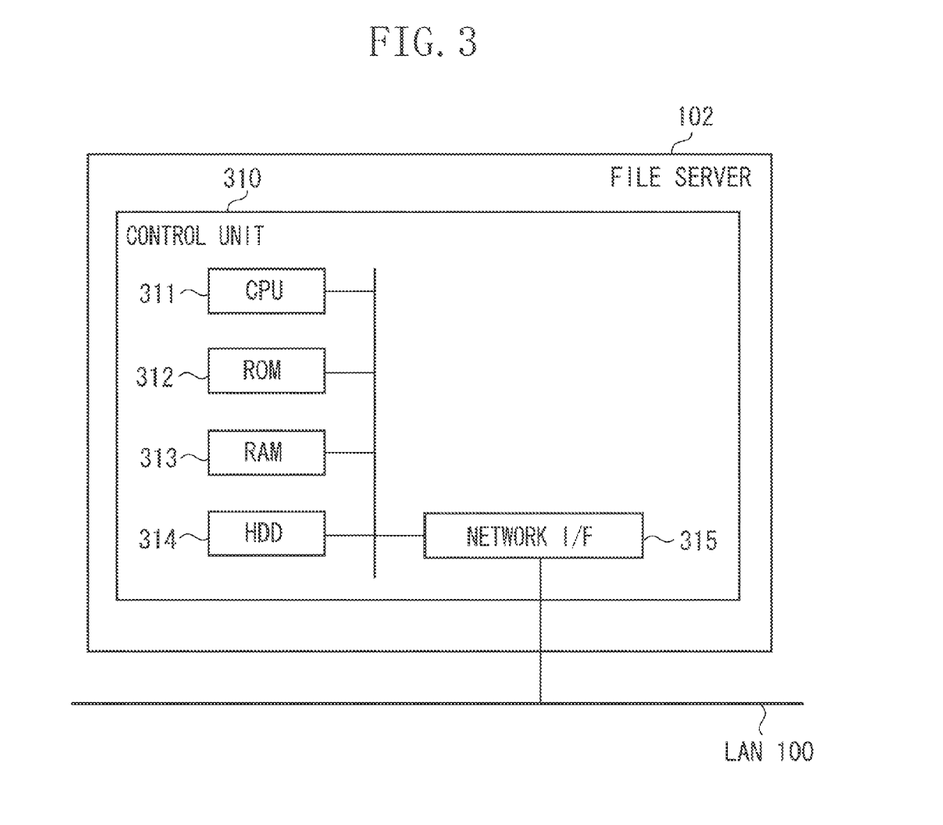
FIG. 3 illustrates a hardware configuration of a file server in the exemplary embodiment of the present invention.

FIG. 3 illustrates a hardware configuration of the file server 102. A control unit 310 including a CPU 311 controls an entire operation of the file server 102. The CPU 311 reads out a control program stored in a ROM 312, to perform various types of control processing. A RAM 313 is used as a temporary storage area such as a main memory or a work area in the CPU 311. An HDD 314 stores image data and various types of programs. A plurality of folders managed in a hierarchy is created in the HDD 314. Image data transmitted from the MFP 101 can be stored in the folders. The image data stored in the folders can be browsed or operated from a PC (not illustrated) on the LAN 100.

A network I/F 315 connects the control unit 310 (the file server 102) to the LAN 100. The file server 102 transmits and receives various types of information to and from another apparatus on the LAN 100 using the network I/F 315.

Operations of the image processing system (services provided using the image processing system) will be described below using a cram school support system as an example. The cram school support system is a system for making business of a cram school, in which documents printed on paper are handled in large amounts, efficient. Particularly, the system enables work for reading the above-mentioned documents using a scanner and for uploading the read documents into a file server to be easily performed. The cram school support system is implemented using an application named "cram school filing" installed into the MFP 101 and a file system on the side of the file server 102 that manages a plurality of folders in a hierarchy.

Figure 4:
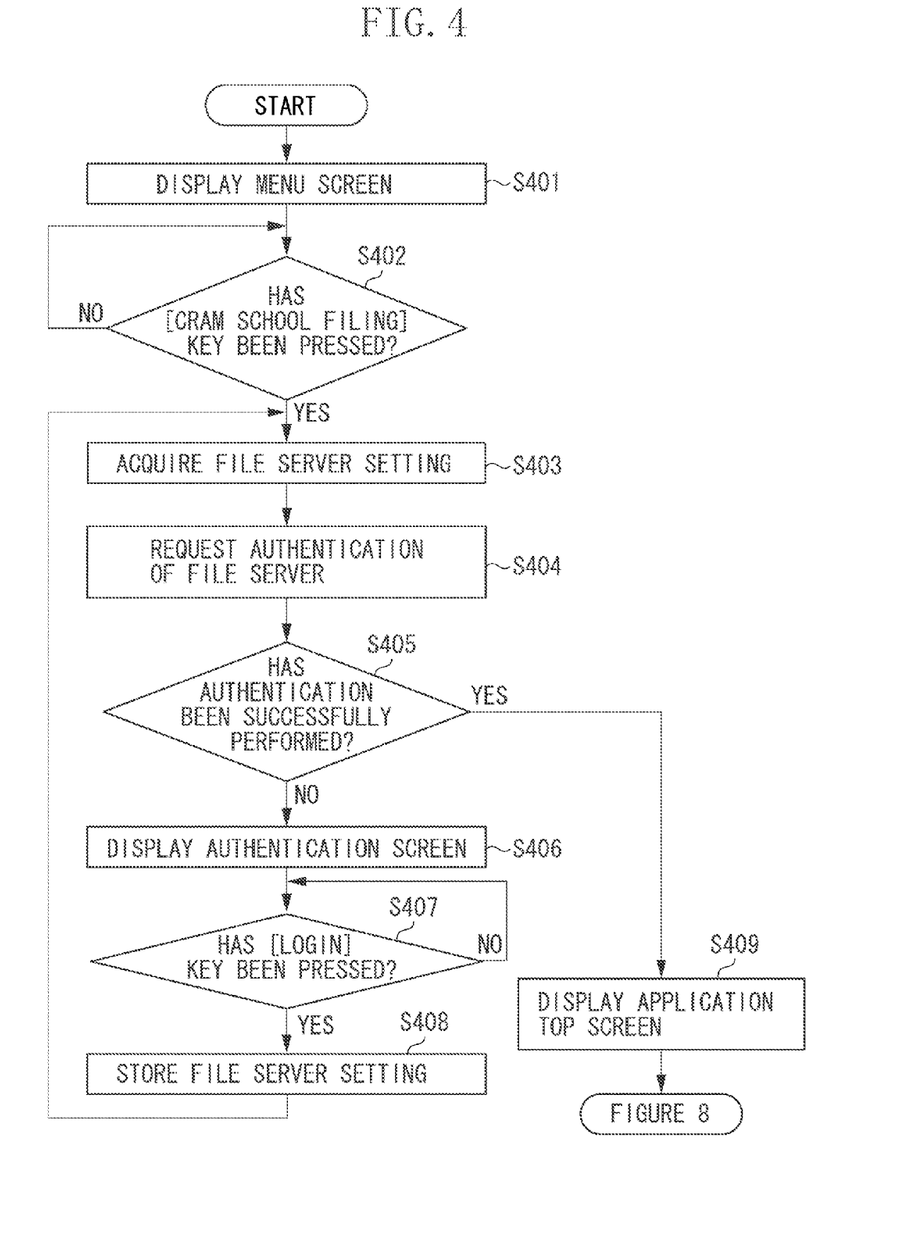
FIG. 4 is a flowchart illustrating operations of the MFP in the exemplary embodiment of the present invention.

FIG. 4 is a flowchart illustrating operations performed after the MFP 101 has been activated until an application top screen 610 of the application named "cram school filing" is displayed. Each of operations (steps) illustrated in the flowchart of FIG. 4 is implemented when the CPU 211 in the MFP 101 executes a control program stored in the HDD 214.

Figure 5A:
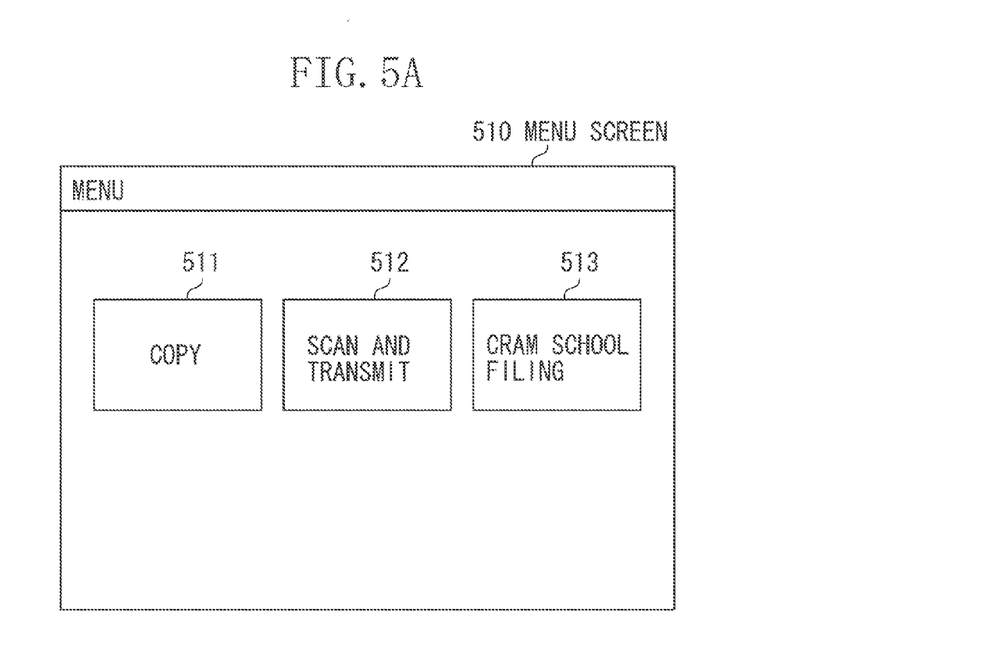
FIGS. 5A and 5B respectively illustrate operation screens of the MFP in the exemplary embodiment of the present invention.

In step S401, the CPU 211 displays a menu screen 510 illustrated in FIG. 5A on the operation unit 220. Functions and applications provided in the MFP 101 are list-displayed on the menu screen 510. A [copy] key 511 and a [scan and transmit] key 512 illustrated in FIG. 5A are operation keys respectively corresponding to functions (native functions) provided in a standard manner in the MFP 101. On the other hand, a [cram school filing] key 513 is an operation key corresponding to a Java (registered trademark)-based application additionally installed in the MFP 101. The MFP 101 may include another native function and another application (not illustrated).

In step S402, the CPU 211 determines whether the [cram school filing] key 513 has been pressed. If the [cram school filing] key 513 has been pressed (YES in step S402), the processing proceeds to step S403. If the [cram school filing] key 513 has not been pressed (NO in step S402), the CPU 211 stands by until the [cram school filing] key 513 is pressed. If the [copy] key 511 or the [scan and transmit] key 512 has been pressed, the functions respectively corresponding to the keys are executed.

In step S403, the CPU 211 acquires a file server setting stored in the HDD 214. The file server setting is a file in a Comma-Separated Values (CSV) or Extensible Markup Language (XML) format including information about the file server 102. The file server setting includes a host name of the file server 102 and information about a root folder serving as a starting point of a folder path. The file server setting includes authentication information (an identifier (ID) and a password) for logging in to the file server 102. An administrator or a user of the MFP 101 needs to previously input the information included in the file server setting via a file server setting screen displayed on the PC (not illustrated).

In step S404, the CPU 211 requests authentication of the file server 102 based on the file server setting that has been acquired in step S403. If the authentication has successfully been performed, the MFP 101 can access the file server 102. In step S405, the CPU 211 determines whether the authentication in the file server 102 has successfully been performed so that the user has successfully logged in to the file server 102. If the authentication has successfully been performed (YES in step S405), the processing proceeds to step S409. If the authentication has unsuccessfully been performed (NO in step S405), the processing proceeds to step S406.

Figure 5B:
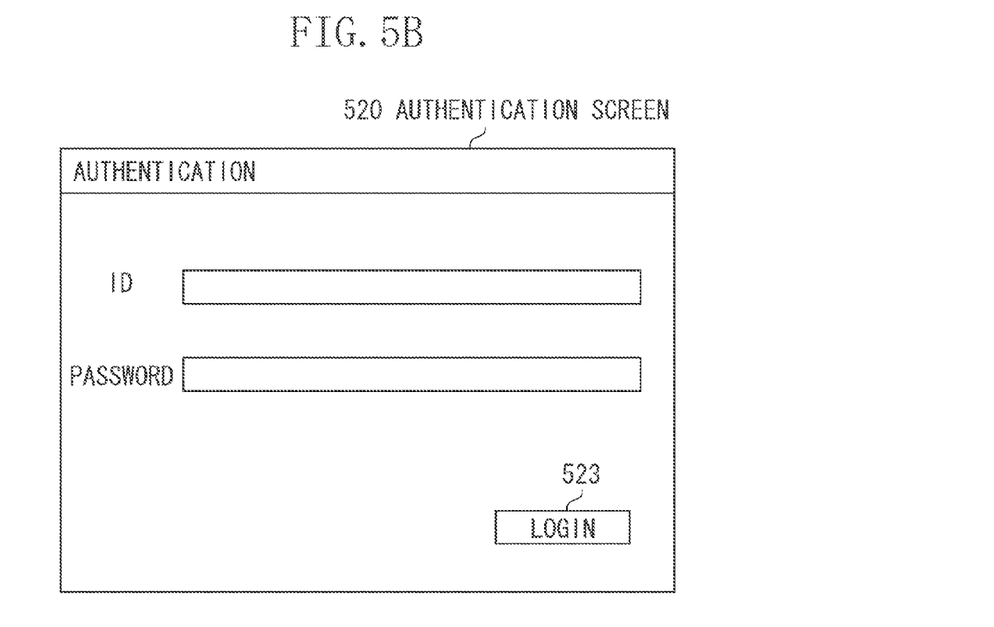

In step S406, the CPU 211 displays an authentication screen 520 illustrated in FIG. 5B on the operation unit 220. If the authentication in the file server 102 has unsuccessfully been performed, the authentication information included in the file server setting may be erroneous. Thus, the CPU 211 causes the user to input the authentication information via the authentication screen 520. In step S407, the CPU 211 determines whether a [login] key 523 has been pressed. If the [login] key 523 has been pressed (YES in step S407), the processing proceeds to step S408. If the [login] key 523 has not been pressed (NO in step S407), the CPU 211 stands by until the [login] key 523 is pressed.

In step S408, the CPU 211 stores the authentication information, which has been input by the user, in the HDD 214, and the processing returns to step S403. The process in step S408 is performed so that the user does not need to input the authentication information at the next and subsequent login times. However, the processing may proceed to step S404 by skipping the processes in steps S408 and S403. Alternatively, after the processing proceeds to step S404 by skipping the processes in steps S408 and S403, the CPU 211 may store the authentication information after determining in step S405 that the authentication has successfully been performed.

Figure 6A:
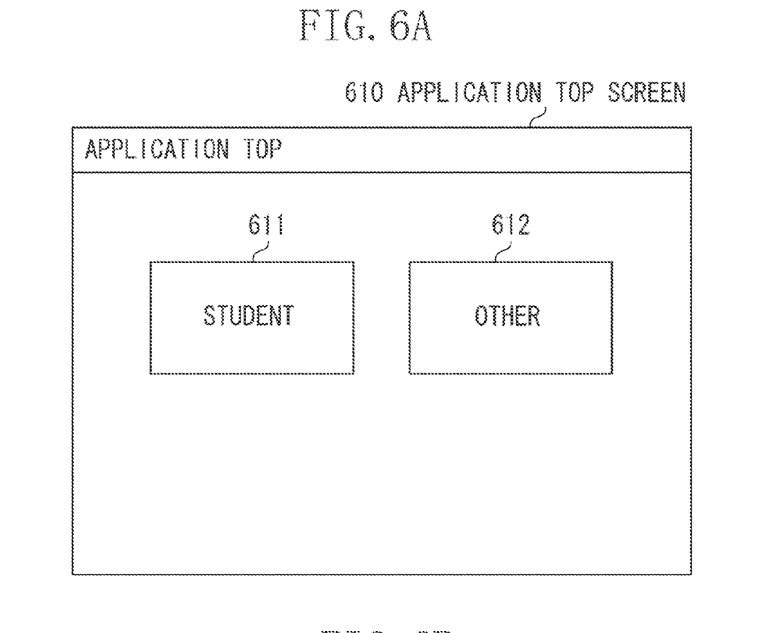
FIGS. 6A and 6B respectively illustrate operation screens of the MFP in the exemplary embodiment of the present invention.

In step S409, the CPU 211 displays an application top screen 610 illustrated in FIG. 6A on the operation unit 220. On the application top screen 610, a [student] key 611 and an [other] key 612 are displayed. In the cram school support system, a folder named [student] and a folder named [other] are created just below the root folder. When the application top screen 610 is displayed, the MFP 101 acquires information about the folders placed just below the root folder from the file server 102, and displays the [student] key 611 and the [other] key 612 based on the acquired information.

When a document relating to each student enrolled at the cram school is uploaded to the file server 102, the [student] key 611 is pressed. When the other document is uploaded to the file server 102, the [other] key 612 is pressed.

Figure 6B:
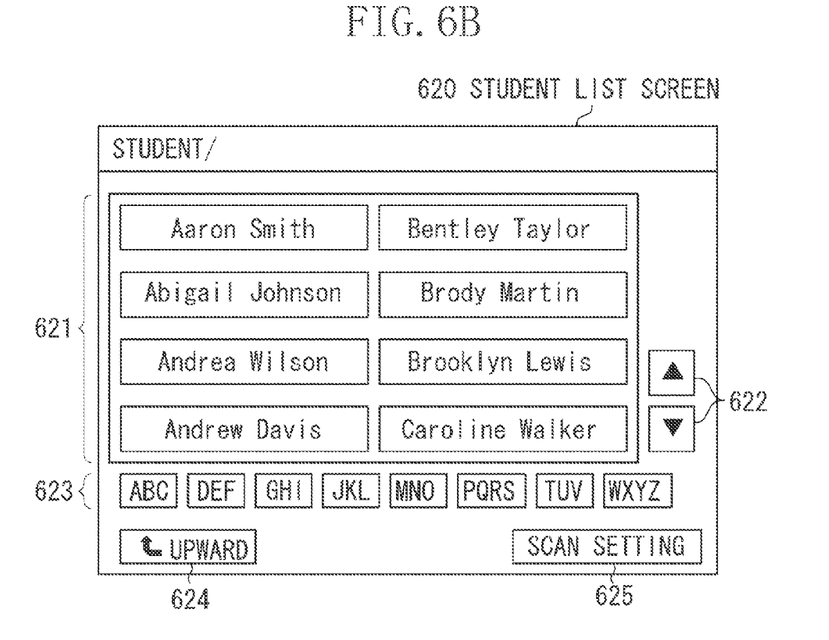

When the [student] key 611 is pressed, a student list screen 620 illustrated in FIG. 6B is displayed on the operation unit 220. A list of names of students registered in the cram school support system is displayed in an area 621. Subfolders, each of which has the name of the student set as its folder name, corresponding to the number of the students, are created just below the [student] folder. When the student list screen 620 is displayed, the MFP 101 acquires information about the subfolders placed just below the [student] folder from the file server 102, and displays the area 621 based on the acquired information. The subfolder corresponding to each of the students can newly be created or deleted by an operation from the PC (not illustrated). The subfolders corresponding to the students are rearranged in alphabetical order to be displayed by the MFP 101.

A scroll key 622 is an operation key for displaying the name of the student (scrolling the screen), which is not displayed in the area 621, in the area 621. An index key 623 is an operation key for designating the first character of the name of the student and displaying the name of the student in the area 621. An [upward] key 624 is an operation key for displaying a folder in a hierarchy that is one level higher than the hierarchy currently displayed. When the [upward] key 624 is pressed, the application top screen 610 is displayed. A [scan setting] key 625 is an operation key for displaying a scan setting screen, described below. If the scan setting screen is displayed using the [scan setting] key 625, the image data generated by the scanner 222 is stored in the [student] folder. If the image data is not permitted to be stored in the [student] folder, the [scan setting] key 625 may not be displayed.

Figure 7A:
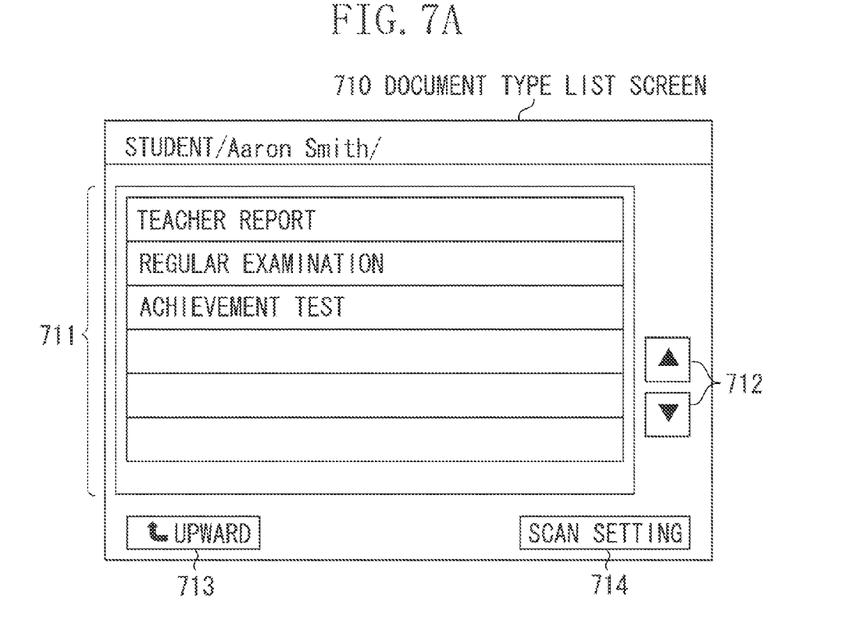
FIGS. 7A and 7B respectively illustrate operation screens of the MFP in the exemplary embodiment of the present invention.

When any one of the operation keys included in the area 621 is pressed, a document type list screen 710 illustrated in FIG. 7A is displayed. FIG. 7A illustrates a case where a student named [Aaron Smith] (a folder named [Aaron Smith]) has been selected. A list of document types registered in the cram school support system is displayed in an area 711. Subfolders each having a name of the document type set as its folder name are created just below the [Aaron Smith] folder. Such subfolders are also similarly created just below each of the other [student] folders.

When the document type list screen 710 is displayed, the MFP 101 acquires information about the subfolder placed just below the [Aaron Smith] folder from the file server 102. The area 711 is displayed based on the information. Such folder by document type can newly be created or deleted by an operation from the PC (not illustrated).

A scroll key 712 is an operation key for displaying the document type (scrolling the screen), which is not displayed in the area 711, in the area 711. There are only three subfolders just below the [Aaron Smith] folder. Thus, the subfolders are all displayed on the screen illustrated in FIG. 7A. If there are seven or more subfolders, however, the subfolders cannot be all displayed. Then, the scroll key 712 is used. An index key is not displayed on the document type list screen 710, unlike on the student list screen 620. An [upward] key 713 is an operation key for displaying a folder in a hierarchy that is one level higher than the hierarchy currently displayed. When the [upward] key 713 is pressed, the student list screen 620 is displayed. A [scan setting] key 714 is an operation key for displaying a scan setting screen, described below. If the scan setting screen is displayed using the [scan setting] key 714, the image data generated by the scanner 222 is stored in the [Aaron Smith] folder.

Figure 7B:
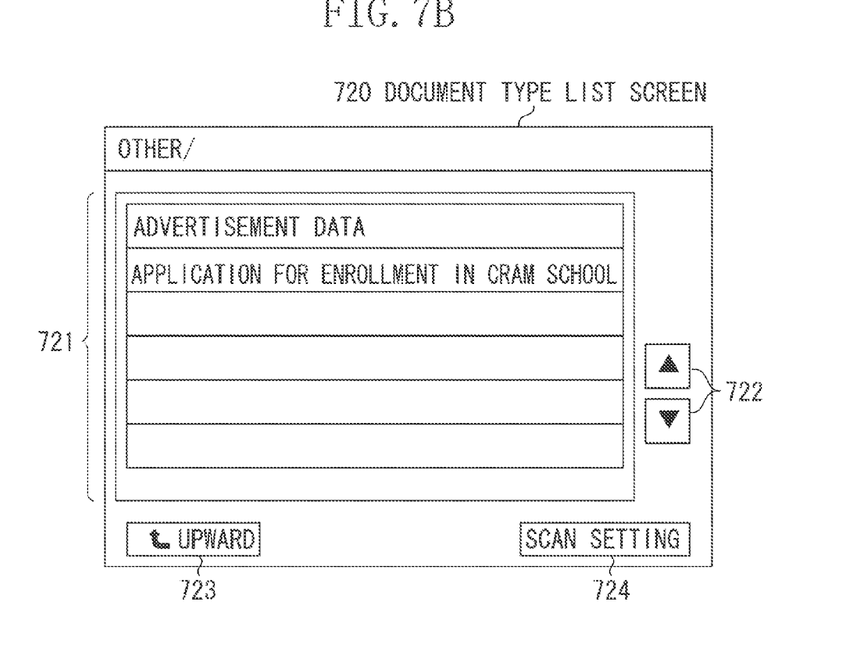

When the [other] key 612 is pressed on the application top screen 610 illustrated in FIG. 6A, a document type list screen 720 illustrated in FIG. 7B is displayed. A list of document types registered in the cram school support system is displayed in an area 721. Subfolders each having a name of the document type set as its folder name are created just below an [other] folder. When the document type list screen 720 is displayed, the MFP 101 acquires information about the subfolder placed just below the [other] folder from the file server 102, and displays the area 721 based on the information. Such folder by type can newly be created or deleted by an operation from the PC (not illustrated).

A scroll key 722 is an operation key for displaying the document type (scrolling the screen), which is not displayed in the area 721, in the area 721. There are only two subfolders just below the [other] folder. Thus, the subfolders are all displayed on the screen illustrated in FIG. 7B. If there are seven or more subfolders, however, the subfolders cannot be all displayed. Then, the scroll key 722 is used. An index key is not displayed on the document type list screen 720, unlike on the student list screen 620. An [upward] key 723 is an operation key for displaying a folder in a hierarchy that is one level higher than the hierarchy currently displayed. When the [upward] key 723 is pressed, the application top screen 610 is displayed. A [scan setting] key 724 is an operation key for displaying a scan setting screen, described below. If the scan setting screen is displayed using the [scan setting] key 724, the image data generated by the scanner 222 is stored in the [other] folder.

When the user selects the folder by document type displayed in FIG. 7A or FIG. 7B, not a content of each of the folders but a scan setting screen as described below is displayed, because each of the folders by document type displayed in FIGS. 7A and 7B has no subfolders. In the cram school support system, the purpose of using the MFP 101 is to upload image data to the file server 102. Thus, in a stage where the folder having no subfolders has been selected, an intention to designate the selected folder as a storage destination of the image data can be read. To reduce time and labor to press the [scan setting] key, the folder having no subfolders is determined as a storage destination of the image data in response to the fact that such folder has been selected, and the scan setting screen is displayed.

In the cram school support system herein described, there exist no subfolders because the creation of the subfolders in the folders by document type displayed in FIGS. 7A and 7B is restricted. However, when the subfolders are permitted to be created, if the subfolders are created, a list of the subfolders is displayed according to the selection of a folder by document type.

Figure 8:
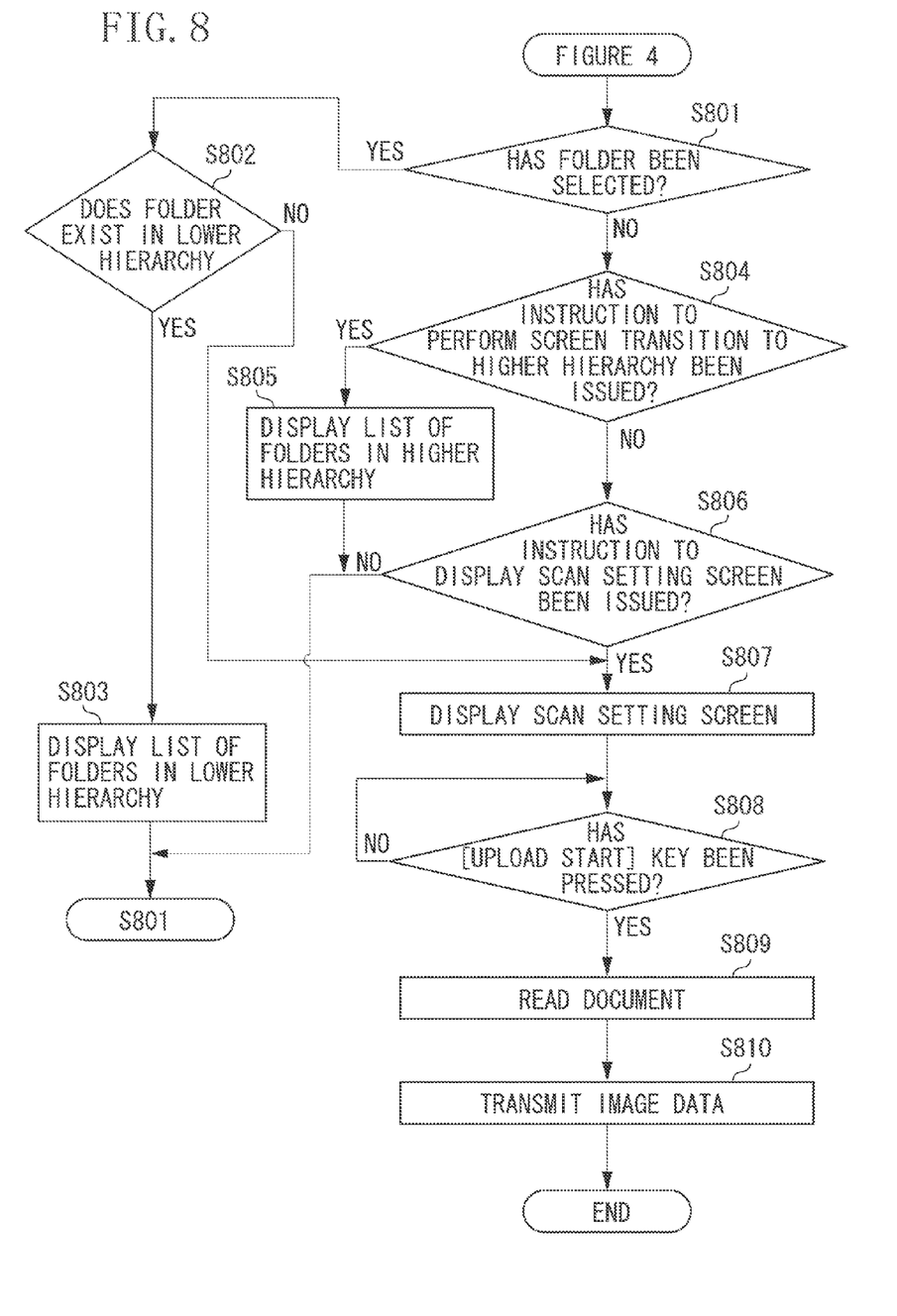
FIG. 8 is a flowchart illustrating operations of the MFP in the exemplary embodiment of the present invention.

FIG. 8 is a flowchart illustrating operations of the MFP 101 including screen transition after the application top screen 610 has been displayed. Each of the operations (steps) illustrated in the flowchart of FIG. 8 is implemented when the CPU 211 in the MFP 101 executes the control program stored in the HDD 214.

In step S801, the CPU 211 determines whether the user has selected a folder. If any one of the [student] key 611, the [other] key 612, and the operation keys included in the area 621, operation keys included in the area 711, and operation keys included in the area 721 is pressed, the CPU 211 determines that the user has selected a folder, and the processing proceeds to step S802.

In step S802, the CPU 211 determines whether the folder, which has been selected in step S801, has subfolders. The determination is performed by inquiring the presence or absence of the subfolders of the file server 102. If any one of the [student] key 611, the [other] key 612, and the operation keys included in the area 621 is pressed, the CPU 211 determines that the selected folder has subfolders (YES in step S802), and the processing proceeds to step S803. On the other hand, if any one of the operation keys included in the area 711 and the operation keys included in the area 721 is pressed, the CPU 211 determines that the selected folder has no subfolders (NO in step S802), and the processing proceeds to step S807. Even if a file is placed just below the selected folder, the selected folder has no subfolders unless a folder exists.

In step S803, the CPU 211 displays a list of subfolders placed just below the folder that has been selected in step S801 (folders in a hierarchy that is one level lower than a hierarchy including the folder that has been selected in step S801). More specifically, this corresponds to screen transition from FIG. 6A to FIG. 6B or FIG. 7B, or screen transition from FIG. 6B to FIG. 7A.

In step S804, the CPU 211 determines whether an instruction to perform screen transition to a higher hierarchy has been issued. If any one of the [upward] keys 624, 713, and 723 is pressed, the CPU 211 determines that the instruction to perform the screen transition to the higher hierarchy has been issued (YES in step S804), and the processing proceeds to step S805. In step S805, the CPU 211 displays a list of folders in a hierarchy that is one level higher than the hierarchy currently displayed. More specifically, this corresponds to screen transition from FIG. 6B or FIG. 7B to FIG. 6A, or screen transition from FIG. 7A to FIG. 6B.

In step S806, the CPU 211 determines whether an instruction to display a scan setting screen has been issued. If any one of the [scan setting] keys 625, 714, and 724 is pressed, the CPU 211 determines that the instruction to display the scan setting screen has been issued, and the processing proceeds to step S807.

Figure 9:
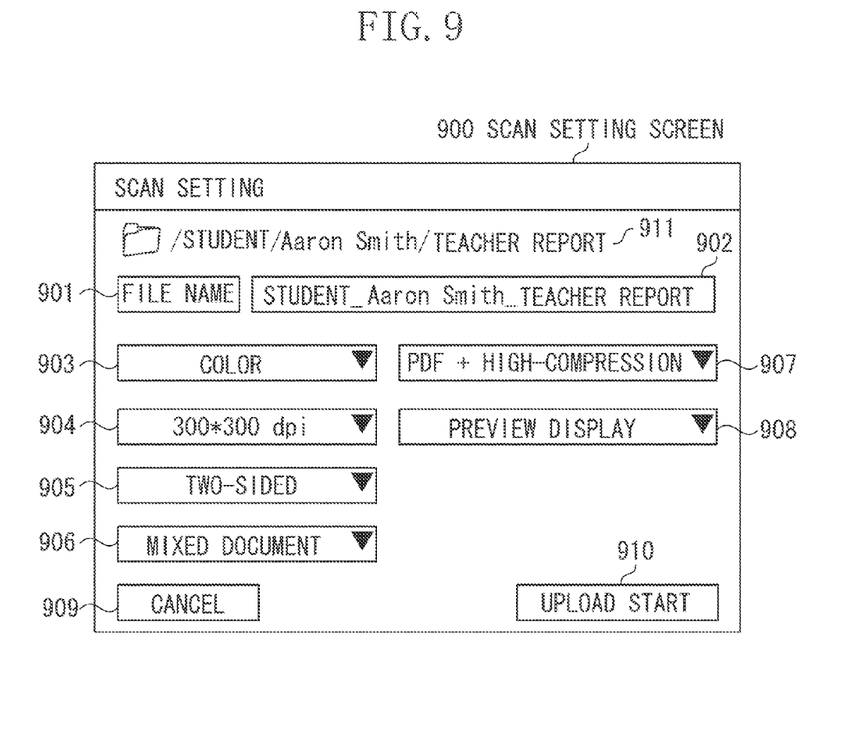
FIG. 9 illustrates an operation screen of the MFP in the exemplary embodiment of the present invention.

In step S807, the CPU 211 displays a scan setting screen 900 illustrated in FIG. 9. FIG. 9 illustrates a case where a folder named [teacher report] placed just below a student named [Aaron Smith] (a folder named [Aaron Smith]) has been selected. In an area 911, folder path information representing a storage destination of the image data generated by the scanner 222 is displayed. As can be seen from an example illustrated in FIG. 9, the image data is stored in the [teacher report] folder.

A [file name] key 901 is an operation key for setting a file name of the image data. When the [file name] key 901 is pressed, a software keyboard is displayed and any character string used as a file name can be input. A file name, which has been default set, is displayed in an area 902. A character string corresponding to a folder path displayed in the area 911 has been default set as a file name.

Operation keys 903 to 908 are operation keys for setting reading parameters for a document. Types of reading parameters other than the illustrated reading parameters may be added. Alternatively, some of the illustrated reading parameters may not be included.

The operation key 903 is for setting a color mode. The user can select a desired color mode from options [color], [gray scale] and [monochrome] displayed in a pull-down manner. The operation key 904 is for setting resolution. The user can select desired resolution from options [300*300 dpi] and [200*200 dpi] displayed in a pull-down manner.

The operation key 905 is for setting a one-sided reading mode or a two-sided reading mode. The user can select a desired two-sided mode from options [one-sided] and [two-sided] displayed in a pull-down manner. The operation key 906 is for setting a mixed document mode. The user can select a desired mixed document mode from options [mixed document] and [document unmixed] displayed in a pull-down manner.

The operation key 907 is for setting a file format. The user can select a desired file format from options [Tagged Image File Format (TIFF)], [Portable Document File (PDF)] and [PDF+high-compression]. The operation key 908 is for setting a preview display mode. The user can select a desired preview display mode from options [preview display] and [preview nondisplay] displayed in a pull-down manner.

When a [cancel] key 909 is pressed, scan setting is cancelled, and a storage destination can be changed into another folder. When an [upload start] key 910 is pressed, reading of a document and transmission of image data to the file server 102 are performed.

Referring to FIG. 8 again, in step S808, the CPU 211 determines whether the [upload start] key 910 has been pressed. If the [upload start] key 910 has been pressed (YES in step S808), the processing proceeds to step S809. If the [upload start] key 910 has not been pressed (NO in step S808), the CPU 211 stands by until the [upload start] 910 key is pressed.

In step S809, the CPU 211 reads the document by the scanner 222 and generate the image data according to the setting performed via the scan setting screen. In step S810, the CPU 211 transmits the image data to the file server 102.

As described above, the cram school support system in the present exemplary embodiment includes the file server 102 for managing a plurality of folders in a hierarchy and the MFP 101 for reading an image on a document to generate image data. When any one of the plurality of folders managed by the file server 102 is selected in the MFP 101, the CPU 211 determines whether the selected folder has subfolders. If the selected folder has subfolders, a list of the subfolders is displayed on a display unit in the MFP 101. On the other hand, if the selected folder has no subfolders, the CPU 211 displays a scan setting screen for setting a reading parameter for the document on the display unit.

By these configurations, time and labor to designate the storage destination of the image data generated by reading the document can be reduced.

The above-mentioned configurations are also applicable to an environment other than the cram school support system if work for storing image data generated by reading a document in a folder is performed.

While the folder is managed outside (in the file server 102) of the scanner apparatus (the MFP 101) in the above-mentioned example, the present invention is also applicable to a case where the folder is managed in the scanner apparatus (the MFP 101). In this case, the image data generated by reading the document is stored in the folder in the apparatus.

An object of the present invention is also attained by performing processing for supplying a storage medium on which a program code of software for implementing functions in the above-mentioned exemplary embodiment is recorded to a system or an apparatus and for causing a computer (or a CPU or a micro-processing unit (MPU)) in the system or the apparatus to read out the program code stored in the storage medium.

In this case, the program code itself read out of the storage medium implements the functions in the above-mentioned exemplary embodiment, and the program code and the storage medium storing the program code constitute the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193038 filed Sep. 18, 2013, which is hereby incorporated by reference herein in its entirety.

What is claimed is:

1. An image processing system comprising:
a server; and
an image processing apparatus that communicates with the server via a network,
wherein the server comprises:
a first memory for storing a first program; and
a first processor for executing the first program,
wherein the server manages a plurality of folders in a hierarchy, and
wherein the image processing apparatus comprises:
a scanner configured to scan a document to generate image data;
a second memory for storing a second program; and
a second processor for executing the second program, wherein the second processor controls to:
receive selection of one of the plurality of folders;
determine whether the selected folder has at least one subfolder;
display a list of the at least one subfolder on a display unit if it is determined that the selected folder has at least one subfolder; and
display a setting screen on the display unit if it is determined that the selected folder has no subfolder,
wherein the displayed setting screen is used to set a reading parameter for scanning the document with the scanner.

2. The image processing system according to claim 1, wherein the image data generated by the scanner based on the reading parameter set via the setting screen is stored in the selected folder.

3. The image processing system according to claim 1, wherein the second processor further controls to receive an operation by a user for the list of the subfolders displayed on the display unit.

4. The image processing system according to claim 3, wherein a screen for displaying the list of the subfolders includes an operation key for displaying the setting screen, and
the second processor further controls to display the setting screen also in a case where the operation key is operated.

5. An information processing apparatus comprising:
a memory for storing a computer program; and
a processor for executing the computer program, wherein the processor controls to:
receive selection of one of a plurality of folders managed in a hierarchy;
determine whether the selected folder has at least one subfolder;
display a list of the at least one subfolder on a display unit if it is determined that the selected folder has at least one subfolder; and
display a setting screen on the display unit if it is determined that the selected folder has no subfolder,
wherein the displayed setting screen is used to set a reading parameter for scanning the document with a scanner.

6. The information processing apparatus according to claim 5, wherein the processor further controls to manage the plurality of folders.

7. The information processing apparatus according to claim 5, wherein the processor further controls to communicate with a file server that manages the plurality of folders.

8. The information processing apparatus according to claim 5, wherein the processor further controls a scanner to read an image on the document to generate image data according to the reading parameter set via the setting screen.

9. The information processing apparatus according to claim 8, wherein the image data generated by the scanner is stored in the selected folder.

10. The information processing apparatus according to claim 5, wherein the processor further receives an operation by a user for the list of the subfolders displayed on the display unit.

11. The information processing apparatus according to claim 10, wherein a screen for displaying the list of the subfolders includes an operation key for displaying the setting screen, and the processor further controls to display the setting screen also in a case where the operation key is operated.

12. An image processing method executed by an apparatus, the method comprising:

managing a plurality of folders in a hierarchy;

receiving selection of one of the plurality of folders;

determining whether the selected folder has at least one subfolder;

displaying, if it is determined that the selected folder has at least one subfolder, a list of the at least one subfolder on a display unit;

displaying a setting screen on the display unit if it is determined that the selected folder has no subfolder, wherein the displayed setting screen is used to set a reading parameter for scanning a document with a scanner; and scanning the document with a scanner based on the set reading parameter to generate image data of the document.

13. An information processing method executed by an apparatus, the method comprising:

receiving selection of one of a plurality of folders managed in a hierarchy;

determining whether the selected folder has at least one subfolder;

displaying, if it is determined that the selected folder has at least one subfolder, a list of the at least one subfolder on a display unit; and displaying a setting screen on the display unit if it is determined that the selected folder has no subfolder, wherein the displayed setting is used to set a reading parameter for scanning a document with a scanner.

14. A non-transitory computer readable storage medium storing a program for causing a computer to execute steps of:

managing a plurality of folders in a hierarchy;

receiving selection of one of the plurality of folders;

determining whether the selected folder has at least one subfolder;

displaying, if it is determined that the selected folder has at least one subfolder, a list of the at least one subfolder on a display unit;

displaying a setting screen on the display unit if it is determined that the selected folder has no subfolder, wherein the displayed setting is used to set a reading parameter for scanning a document with a scanner; and scanning the document with the scanner based on the set reading parameter to generate image data of the document.

15. A non-transitory computer readable storage medium storing a program for causing a computer to execute steps of:

receiving selection of one of a plurality of folders managed in a hierarchy;

determining whether the selected folder has at least one subfolder;

displaying, if it is determined that the selected folder has at least one subfolder, a list of the at least one subfolder on a display unit; and displaying a setting screen on the display unit if it is determined that the selected folder has no subfolder, wherein the displayed setting screen is used to set a reading parameter for scanning a document.

* * * * *